Figure 1:
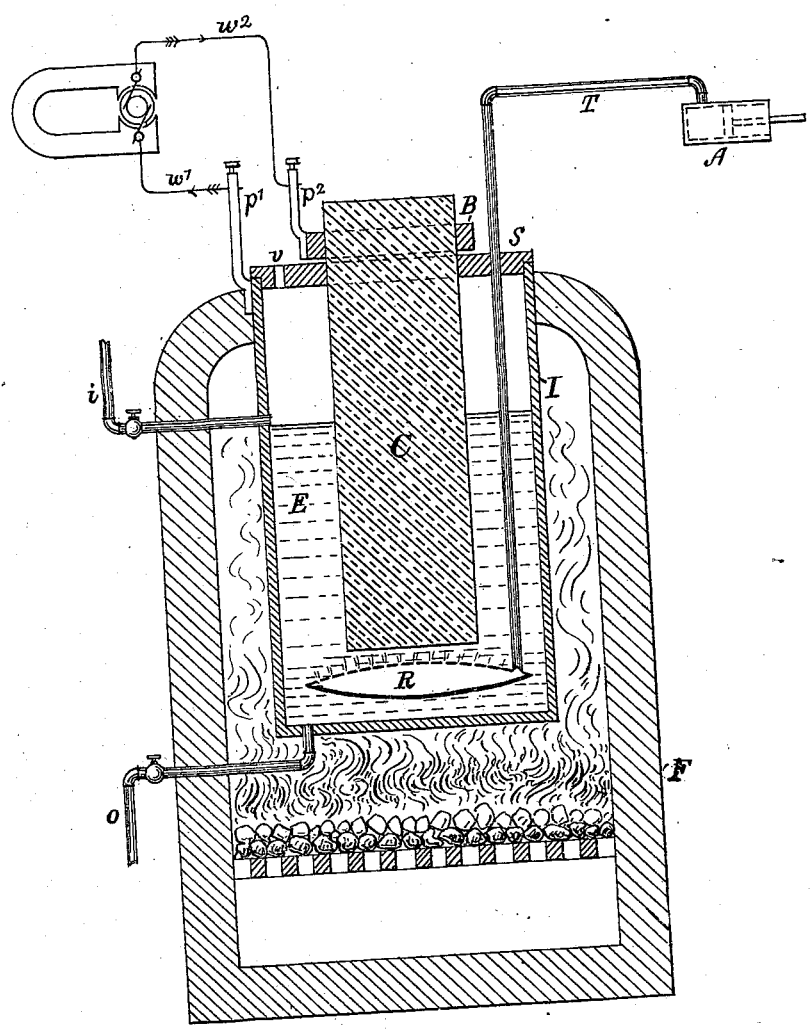

(Model.)

W. W. JACQUES.
METHOD OF CONVERTING POTENTIAL ENERGY OF CARBON INTO ELECTRICAL ENERGY.

No. 555,511.    Patented Mar. 3, 1896.

Attest.
James H. Flanagan
B. L. Ruggles

Inventor,
William W. Jacques

United States Patent Office.

WILLIAM W. JACQUES, OF NEWTON, MASSACHUSETTS.

METHOD OF CONVERTING POTENTIAL ENERGY OF CARBON INTO ELECTRICAL ENERGY.

SPECIFICATION forming part of Letters Patent No. 555,511, dated March 3, 1896.

Application filed June 5, 1895. Serial No. 551,757. (Model.)

*To all whom it may concern:*

Be it known that I, WILLIAM W. JACQUES, of Newton, in the State of Massachusetts, have invented a new and useful Method or Process of Converting the Potential Energy of Carbon or Carbonaceous Materials into Electrical Energy, of which the following is a specification.

It is well known that carbon and carbonaceous materials—such as anthracite and bituminous coals, coke, and gas-carbon—have a chemical affinity for oxygen, and that when brought at a proper temperature in contact with oxygen, whether pure or diluted, as in the case of air, such carbons enter into chemical combination with the oxygen and the potential energy of the coal is converted into heat. This process is known as "combustion."

I have discovered that if oxygen, whether pure or diluted, as in air, be caused to combine with carbon or carbonaceous materials, not directly, as in the case of combustion, but through an intervening electrolyte, the potential energy of the carbon may be converted directly into electrical energy instead of into heat.

My invention is founded on this discovery; and it consists in the process of converting the potential energy of carbon or carbonaceous materials into electrical energy by chemically combining oxygen with said carbon or carbonaceous materials through an intervening electrolyte.

A convenient and practical way of carrying out my invention is to immerse a cylinder of carbon in molten sodium hydrate and force a current or blast of air into the molten sodium hydrate in such manner that the sodium hydrate becomes impregnated with oxygen in excess over that which sodium hydrate normally contains. A circuit being completed from the sodium hydrate, which is the electrolyte, by means of a collecting-electrode not chemically acted upon by the electrolyte and an extraneous conductor to the carbon an electric current flows continuously from the sodium hydrate through the collecting-electrode and the exterior conductor to the carbon, the strength of the current depending primarily upon the rapidity with which the air is blown into the sodium dydrate, and the oxygen of the air caused to combine with the carbon.

In this process the carbon is gradually converted into carbonic acid, which mostly bubbles up through the electrolyte and escapes. The resultant composition of the sodium hydrate remains unchanged, excepting as hereinafter explained, and oxygen from the air is consumed. The nitrogen with which the oxygen of the air is diluted, having no chemical affinity for any other substance present, simply bubbles through the electrolyte and escapes. The sodium hydrate is contained in a vessel of pure iron, upon which it has no sensible chemical action when melted, and this iron vessel serves as the collecting-electrode or positive pole of the generator, while the carbon forms the oxidizable electrode or negative pole.

My conception of the function of the electrolyte is that it carries oxygen electrolytically from the air to the carbon, or that the phenomenon of eletrolytic action causes the conversion of the potential energy of the carbon into electrical energy instead of into heat, as is the case when oxygen combines with carbon without the intervention of an electrolyte. It is desirable in order to facilitate the chemical action, and consequently obtain a more considerable current of electricity, to thoroughly impregnate the electrolyte with oxygen, and this may be done by admitting the air under pressure in a considerable number of fine sprays. It is also desirable to maintain a constant circulation of the electrolyte, so that new portions, freshly charged with oxygen, may successively be brought in contact with the carbon. Such circulation is well obtained by the ebullition into which the electrolyte is thrown by the admission of air under pressure. Again, it is desirable, in order to prevent the setting up of electromotive forces opposed to the proper electromotive force of the generator, to keep the whole body of the electrolyte and the contained carbons and containing-vessel, used also as a collector, at a more or less uniform temperature throughout, and this is convenienly done by the ebullition of the electrolyte due to the air forced in. Again, the constant ebullition of the electrolyte removes from the surface of the consumed carbon such ash and other products of chemical action as may form upon it, thus leaving fresh surfaces of carbon continually exposed to the action of the electrolyte.

Figure 2:
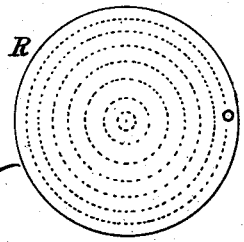

Figure 1 shows a suitable apparatus for practicing my invention, making use of sodium hydrate as an electrolyte and air as a source of oxygen-supply. Fig. 2 is a plan view of the "rose" for distributing the air.

I is a pot, of pure iron. Good rolled Norway iron answers the purpose.

E is the electrolyte, which in this case is caustic soda, (sodium hydrate.) It need not be free from the usual impurities found in the commercial article.

C is the carbon, which must be, when placed in the electrolyte, a good conductor of electricity.

B is a metallic clamp for making a good electrical connection between the carbon and the lead wire $w^2$.

$p^2$ is the binding-post by which the lead wire $w^2$ is connected to the metallic clamp B.

$p'$ is the binding-post by which the lead wire $w'$ is connected to the iron pot I.

F is a furnace surrounding the generator and used to keep the generator and the inclosed electrolyte at the proper temperature, (say 400° to 500° centigrade.)

A is an air-pump that forces air through the tube T into the rose R, from which it is forced into the electrolyte in a number of fine sprays. The rose R is shown also in plan in Fig. 2. It is made of some metal not acted upon by the electrolyte and is pierced with a large number of fine pin-holes, as shown.

S is a cover of non-conducting material, which serves also to support the carbon and insulate it from the iron pot.

$v$ is a vent for allowing the refuse gases to escape.

$o$ is an outlet for drawing off the electrolyte when contaminated, and $i$ is an inlet for supplying fresh electrolyte.

The apparatus being put together as shown and the electrolyte having been brought to the proper temperature, the pump A is operated and air is forced into the electrolyte, causing a violent ebullition, which ebullition supplies to the electrolyte an excess of oxygen, brings fresh portions of the electrolyte continually in contact with the carbon, detaches the carbonic acid and ash formed on the surface of the carbon, and keeps the whole interior of the generator at a uniform temperature.

Although the greater part of the carbonic acid, whether resulting from the union of carbon and oxygen or already existing in the air-supply, bubbles up through the electrolyte and escapes, a portion of this carbonic acid combines with a portion of the caustic soda to form carbonate of soda, and this, together with the ash from the carbon, slowly contaminates the electrolyte, and in the course of time lessens its efficiency. The efficiency of the generator may, however, be maintained by drawing off from time to time a portion of the contaminated electrolyte and admitting a fresh portion to take its place.

The contaminated electrolyte may be purified by well-known simple processes.

The contamination of the caustic soda by its union with carbonic acid may be reduced, and its life consequently prolonged, by adding a small percentage of oxide of magnesium. My conception of the action of the oxide of magnesium is that the free carbonic acid combines with it in preference to the caustic soda, and that the carbonate of magnesium so formed is quickly decomposed into carbonic acid, which escapes, and oxide of magnesium which is again ready to repeat its action. Briefly, the oxide of magnesium serves as a carrier to convey the carbonic acid through the electrolyte.

My invention is not limited to the particular electrolyte above mentioned, nor to the air as a source of oxygen-supply, nor to the apparatus above described.

There are many electrolytes that may be used in practicing my invention. Following are some of the desirable characteristics: They should become liquid at a convenient temperature. They should possess good electrolytic conductivity. They should be capable of readily taking up oxygen from the air or other source of supply, and also capable of readily giving up oxygen into combination with the carbon. They should not have a strong affinity for carbonic acid, and, in case air is used as a source of oxygen supply, should not have any considerable affinity for the nitrogen or other substances with which the oxygen of the air is diluted. The molten hydrates of potash and soda are especially suitable for practical use.

Instead of using the air as a source of oxygen supply, it is evident that I may use oxygen artificially prepared by any of the well-known methods, and, as might naturally be supposed, the chemical action takes place more rapidly with pure oxygen than when the oxygen is diluted, as in air.

The air or oxygen may be supplied to the electrolyte in a heated condition.

The collecting-electrode or positive pole, which may or may not be the containing-pot, should be made of conducting material not considerably acted upon by the electrolyte, from which action, however, the current flowing from the electrolyte to the collecting-electrode tends to protect the latter. Platinum is almost universally applicable, though expensive. Pure iron is very generally applicable and inexpensive. Steel and iron containing any considerable quantity of carbon should be avoided, in that they may set up an inverse electromotive force, which materially reduces the efficiency of the generator.

Forms of carbon that I have found convenient for use are gas-carbon, anthracite coal that has been so baked as to give it conductivity, bituminous coal from which sufficient of the hydrocarbons have been driven off to give it conductivity, charcoal, and in fact any form of carbon or carbonaceous material which has or to which may be given sufficient conductivity to allow of the conduction of the electric current to or from the seat of chemical action.

I prefer to mold the carbon into one or more solid cylinders or plates, (which may be done by well-known processes,) as excellent electrical connection may be conveniently made between such carbons and the lead wires.

The volume of current from such a generator as I have described is very large, but the voltage is smaller than is demanded for most commercial purposes. Greater voltage may of course be obtained by coupling any desired number of such generators in series, or the voltage from a single generator may be increased at the expense of the volume of current by well-known methods of transformation.

I claim—

1. The method of converting the potential energy of carbon or carbonaceous materials into electrical energy, which consists in chemically combining oxygen with said carbon or carbonaceous materials through an intervening electrolyte.

2. The method of converting the potential energy of carbon or carbonaceous materials into electrical energy, which consists in chemically combining oxygen with said carbon or carbonaceous materials by impregnating an intervening electrolyte with an excess of oxygen.

3. The method of converting the potential energy of carbon or carbonaceous materials into electrical energy, which consists in chemically combining oxygen with said carbon or carbonaceous materials by impregnating an intervening electrolyte with air.

4. The method of converting the potential energy of carbon or carbonaceous materials into electrical energy, which consists in chemically combining oxygen with said carbon or carbonaceous materials by impregnating a molten basic electrolyte with oxygen or air and collecting the electricity from the electrolyte by an electrode not chemically acted upon by said impregnated electrolyte when the circuit is completed.

5. The herein-described process of generating electricity through the combination of oxygen with carbon by supplying a blast of oxygen or air to a carbon electrode through an electrolyte.

6. The herein-described process of generating electricity through the combination of oxygen with carbon which consists in supplying a blast of air to a carbon electrode through molten sodium or potassium hydrate.

7. As a generator of electricity by the chemical combination of carbon with oxygen, an oxidizable electrode of carbon or carbonaceous material, an electrolyte continuously impregnated with oxygen and a collecting-electrode not chemically acted upon by said impregnated electrolyte when the circuit is completed.

8. As a generator of electricity by the chemical combination of carbon with oxygen, an oxidizable electrode of carbon or carbonaceous material, a molten basic electrolyte continuously impregnated with oxygen or air, a collecting-electrode not chemically acted upon by said impregnated electrolyte when the circuit is completed, a containing-vessel of iron and means for maintaining the electrolyte in a molten condition.

9. As a generator of electricity by the chemical combination of carbon with the oxygen of the air, an oxidizable electrode of carbon or carbonaceous material, an electrolyte of molten sodium or potassium hydrate continuously impregnated with oxygen by a blast of air, a collecting-electrode not chemically acted upon by said impregnated electrolyte when the circuit is completed, a containing-vessel of iron and means for maintaining the electrolyte in a molten condition.

WILLIAM W. JACQUES.

Witnesses:
W. W. SWAN,
WM. SULLIVAN.